F. L. BABCOCK.
TOY.
APPLICATION FILED JUNE 7, 1920.
1,353,703.  Patented Sept. 21, 1920.
Fig. 1.
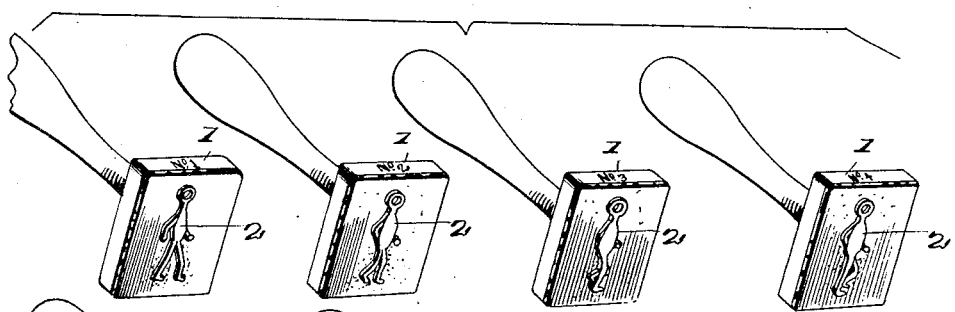
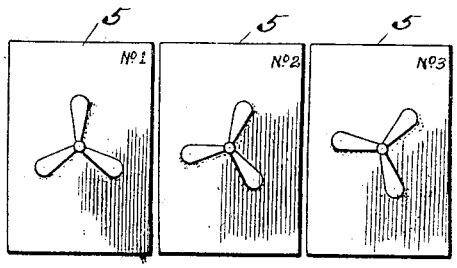
Fig. 3.
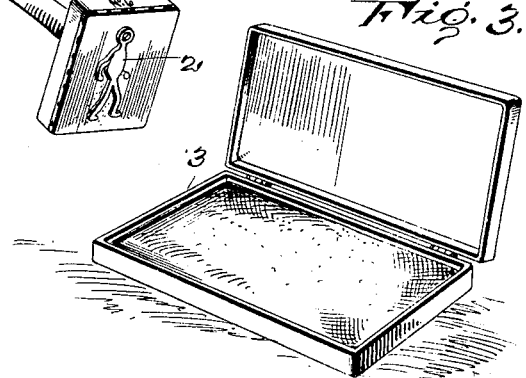
Fig. 2.
Fig. 4.
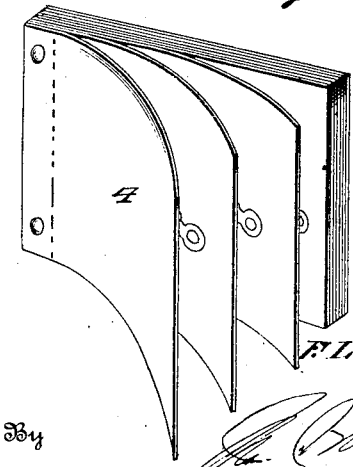
Inventor
F. L. Babcock.
By
Attorney

UNITED STATES PATENT OFFICE.

FAY LEON BABCOCK, OF LARGO, FLORIDA.

TOY.

1,353,703.  Specification of Letters Patent.  Patented Sept. 21, 1920.

Application filed June 7, 1920. Serial No. 387,149.

*To all whom it may concern:*

Be it known that I, FAY L. BABCOCK, a citizen of the United States of America, residing at Largo, in the county of Pinellas and State of Florida, have invented certain new and useful Improvements in Toys, of which the following is a specification.

The invention relates to an improvement in toys, and more particularly to a series of elements through or by the use of which a series of distinctive pictures or representations may be made, which pictures or representations when assembled in proper sequence will provide the well known motion picture book.

The characteristic feature of the present invention is the provision of distinctive elements, as stamps, stencils, or the like, preferably consecutively numbered and successively constructed to permit of the printing or stenciling upon appropriate surfaces of the successive positions of the particular object in motion, so that with these stamps or stencils, a child may with an ink pad or other marking means, imprint on a series of cards or sheets of paper the successive positions of the particular object, and then assembling such cards or sheets in proper order, may pass them rapidly before the eye in usual manner, and thereby apparently visualize the object in motion.

The invention is not concerned with the character of the imprints, nor the particular manner of securing impressions, being particularly directed to the provision of a series of printing stamps, stencils, or the like, which are consecutively numbered or marked, and which in succession bear different position representations of the same object, so that with these printing members in sufficient number to depict the motion or motions of the object or objects desired, there is provided a toy, by which a child may make his own motion pictures as an amusement.

In the drawings:—

Figure 1 represents a series of printing stamps made in accordance with this invention.

Fig. 2 is a series of stencils carrying out the invention.

Fig. 3 is a perspective view of the ink pad used with the stamps.

Fig. 4 is a perspective view of the motion picture book, using the leaves formed by the use of the stamps or stencils.

The drawing in the successive representations thereon considered as a single figure, indicate a series of hand stamps illustrating the invention.

The invention as illustrated comprises ordinary hand stamps 1, made up in a set of a sufficient number for the motion sought to be depicted, the hand stamps being successively marked, as by numbering or the like to indicate the order in which they are to be used.

The printing surface of the respective hand stamps are made up to represent an object or objects, as at 2. The object on the successive hand stamps being progressively changed in position in accordance with a contemplated movement of such object.

With the use of an ink pad 3, the child can print an impression from each hand stamp of the series on separate cards or slips, and by arranging such in the order indicated by the hand stamps, and in the well known motion picture book form, as indicated at 4, there will be provided a motion picture book capable of the ordinary uses and results.

Of course the invention contemplates the use of stencils, as indicated at 5, or any other apropriate member by means of which the desired imprints may be conveniently made by the child, and in this connection it will be understood that there is no definite limit to the number of such hand stamps and stencils in a particular series, the number being governed by the variety and extent of motion desired in the object depicted.

Each printing surface is permanently fixed, and complete in itself so that under some circumstances a grotesque motion or motions may be obtained by mixing the order in which the imprints are arranged in book form.

What I claim is:—

1. A toy comprising a series of elements adapted to transfer an impression onto a surface, the impression forming portions of the elements representing successive positions of an object in motion.

2. A toy comprising a series of printing elements having printing surfaces, the elements being marked to indicate their order of use, and the successively marked elements being formed on their printing surfaces to represent successive positions of an object or objects in motion.

3. A toy made up of a series of elements, from which a surface impression can be had, the elements being marked to indicate successive use, and the successively marked elements providing a series of independent impressions depicting respectively successive positions of an object in motion.

4. A toy comprising a series of independent elements having means whereby each may be employed in producing a representation of an object in a predetermined and different position, the elements used in a predetermined order producing successive positions of an object in motion.

In testimony whereof I affix my signature.

FAY LEON BABCOCK.